US00RE34940E

United States Patent [19]

Gulliver

[11] E Patent Number: Re. 34,940

[45] Reissued Date of Patent: May 16, 1995

[54] CARTON TRAY WITH IMPROVED CORNER CONSTRUCTION AND METHOD OF MAKING

[75] Inventor: Richard F. Gulliver, Tuscaloosa, Ala.

[73] Assignee: Gulf States Paper Corporation, Tuscaloosa, Ala.

[21] Appl. No.: 86,839

[22] Filed: Jul. 7, 1993

Related U.S. Patent Documents

Reissue of:

[64] Patent No.: 5,183,201
Issued: Feb. 2, 1993
Appl. No.: 796,599
Filed: Nov. 22, 1991

[51] Int. Cl.[6] ..... B65D 5/24; B65D 5/46

[52] U.S. Cl. ..... 229/117.12; 229/123.2; 229/186; 229/240; 229/243; 229/906; 493/128; 493/151; 493/183

[58] Field of Search ..... 229/117.12, 123.2, 123.3, 229/125.35, 186, 228, 240, 242, 243, 244, 902, 903, 906; 493/128, 130, 131, 151, 162, 183

[56] References Cited

U.S. PATENT DOCUMENTS

| | | | |
|---|---|---|---|
| 2,215,348 | 9/1940 | Cowan . | |
| 2,241,710 | 5/1941 | Lowey . | |
| 2,241,711 | 5/1941 | Lowey . | |
| 2,409,460 | 10/1946 | Waters . | |
| 2,665,616 | 1/1954 | Jungmayr . | |
| 2,781,159 | 2/1957 | Copeman | 229/186 |
| 2,828,061 | 3/1958 | Zerlin . | |
| 2,847,151 | 8/1958 | Meyer-Jagenberg . | |
| 3,064,874 | 11/1962 | Kauffeld . | |
| 3,146,934 | 9/1964 | Steiger | 229/186 |
| 3,211,359 | 10/1965 | Fickes | 229/240 |
| 3,829,004 | 8/1974 | Graser . | |
| 4,130,237 | 12/1978 | Struble . | |
| 4,215,780 | 8/1980 | Carlson | 229/240 |
| 4,304,352 | 12/1981 | Humphries . | |
| 4,361,236 | 11/1982 | Lavery | 229/186 |
| 4,449,633 | 5/1984 | Johnson et al. . | |
| 4,594,492 | 6/1986 | Maroszek . | |
| 4,746,019 | 5/1988 | Prater | 229/903 |
| 4,836,439 | 6/1989 | Hart . | |
| 4,901,911 | 2/1990 | Drexhage . | |
| 4,919,785 | 4/1990 | Willey . | |
| 4,930,639 | 6/1990 | Rigby . | |
| 4,951,868 | 8/1990 | Mode | 229/125.35 |
| 5,009,320 | 4/1991 | Kramer . | |

FOREIGN PATENT DOCUMENTS

| | | |
|---|---|---|
| 521344 | 7/1953 | Belgium . |
| 1404055 | 11/1965 | France . |
| 396992 | 1/1921 | Germany . |
| 738714 | 8/1943 | Germany . |
| 939550 | 2/1956 | Germany . |
| 1022516 | 6/1958 | Germany . |
| 1142099 | 7/1963 | Germany . |
| 1265648 | 4/1968 | Germany . |
| 8052 | of 1912 | United Kingdom . |
| 944763 | 12/1963 | United Kingdom . |

*Primary Examiner*—Gary E. Elkins
*Attorney, Agent, or Firm*—Cushman, Darby & Cushman

[57] ABSTRACT

A carton tray formed from a flat carton blank including a bottom wall panel, four side wall panels integral with the bottom wall panel along four side fold lines and a gusset wall panel integral with each pair of adjacent side wall panels along two end fold lines extending from a corner point in angularly related relation with respect to one another. In erected condition, each gusset wall panel is brought into surface-to-surface abutting relation with an end portion of one of the associated pair of adjacent side wall panels defined by one of the associated two end fold lines. An adhesive adheres each gusset wall panel with the associated one side wall end portion to thereby form a sealed integral corner construction between each pair of adjacent side wall panels which is defined (1) exteriorly by the associated gusset wall panel adhesively adhered in abutting relation to the associated one side wall end portion with the associated one end fold line extending generally in a plane coincident with an interior surface of the associated one side wall panel from the associated corner point and (2) interiorly by another of the associated two end fold lines extending from the associated corner point along the surface of the associated one side wall panel.

29 Claims, 8 Drawing Sheets

CARTON TRAY WITH IMPROVED CORNER CONSTRUCTION AND METHOD OF MAKING

Matter enclosed in heavy brackets [ ] appears in the original patent but forms no part of this reissue specification; matter printed in italics indicates the additions made by reissue.

This invention relates to carton-type containers and particularly to carton-type containers which include or comprise a carton tray suitable to retain consumable contents therein containing liquid so that the contents can be (1) heated in an oven while contained therein and (2) thereafter consumed while retained therein.

The type of carton container herein contemplated is exemplified by the cartons disclosed in the following patents: U.S. Pat. Nos. 4,304,352, 4,594,492, 4,901,911, 4,919,785, 4,930,639, and 5,009,320.

The carton tray disclosed in the aforesaid patents is formed from a flat carton blank which includes a bottom wall panel defined by four sides along four side fold lines wherein each pair of adjacent side fold lines extend at an angle with respect to each other from a corner point defining one of four corners of said bottom wall panel, four side wall panels integral with the bottom wall panel along the four side fold lines and a pair of gusset wall panels integral with each pair of adjacent side wall panels along three fold lines extending from an associated corner point in angularly related relation with respect to one another. Each set of three angularly related fold lines includes a central gusset fold line integrally interconnecting the associated pair of gusset wall panels and two end fold lines integrally interconnecting each pair of adjacent side wall panels to the associated pair of gusset wall panels. In erecting the flat carton blank into a carton blank, the side wall panels are folded along the side fold lines in the same direction with respect to said bottom wall panel and each pair of gusset wall panels are folded together in surface-to-surface abutting relation along the central gusset fold line therebetween to bring the two end fold lines in superposed relation and then folded together along the superposed end fold lines to bring one of two abutted together gusset wall panels into surface-to-surface engagement with one of the associated pair of side wall panels. The resultant corner construction is defined similarly exteriorly and interiorly except that the pair of abutted gusset wall panels abut either the interior or exterior of an adjacent side wall panel. While the resultant corner is of sealed integral construction, there are other characteristics of the corner construction which are not as functionally advantageous as could be the case otherwise and there always exists the need to achieve a corner construction which is more cost effective as well as more functionally advantageous.

It is an object of the present invention to fulfill in large measure the need expressed above. In accordance with the principles of the present invention, this objective is obtained by providing a carton tray suitable to retain consumable contents therein containing liquid so that the contents can be (1) heated in an oven while retained therein and (2) thereafter consumed while retained therein, which carton tray is formed from a flat carton blank. The flat carton blank includes (1) a bottom wall panel having a periphery defined along four sides by four side fold lines interrelated so that there are four different pairs of adjacent side fold lines wherein each pair of adjacent side fold lines extend at an angle with respect to each other from a corner point defining one of four corners of the bottom wall panel, (2) four side wall panels integral with the bottom wall panel along the four fold lines interrelated so that there are four different pairs of adjacent side wall panels, and (3) a gusset wall panel integral with the each adjacent side wall panels along two end fold lines extending in angularly related relation with respect to one another from the corner point associated with the pair of adjacent side fold lines with which the pair of adjacent side wall panels is integral. The side wall panels are folded along the side fold lines in a direction which is the same in relation to the bottom wall panel into an erected position wherein each of the gusset wall panels is folded along the associated angularly related end fold lines in opposite directions with respect to the associated pair of adjacent side wall panels so as to bring each gusset wall panel into surface-to-surface abutting relation with an end portion of one of the associated pair of adjacent side wall panels defined by one of the associated two end fold lines. An adhesive serves to adhere each of the gusset wall panels in abutting relation with the associated one side wall end portion to thereby form a sealed integral corner construction between each pair of adjacent side wall panels which is defined (1) exteriorly by the associated gusset wall panel adhesively adhered in abutting relation to the associated one side wall end portion with the associated one end fold line extending generally in a plane coincident with an interior surface of the associated one side wall panel from the associated corner point and (2) interiorly by another of the associated two end fold lines extending from the associated corner point along the surface of the associated one side wall panel.

The adhesively sealed abutting gusset wall panels and side wall end portions extending exteriorly at each corner construction provide added functional advantages depending upon the additional features of the present invention which are additionally provided such as upper edge wall panels integrally hinged to certain of the side wall panels along edge hinge lines parallel with the side hinge lines and an integral or separate carton lid part, suitably connected to the carton tray and providing a lid panel operable to enclose the contents within the tray which is scored to facilitate disconnection of a portion of the top panel sufficient (1) to vent the contents during heating in an oven and (2) to provide access to the contents after heating. The adhesively sealed abutting gusset wall panel and side wall end portion extending exteriorly at each corner construction in the most simplistic form of carton tray provide handles enabling a user to conveniently carry the carton tray and its contents to an from the heating oven. Where edge wall panels are provided exteriorly between the one side wall panels from which the exterior corner constructions project, the exterior corner constructions cooperate with retained connected portions of the lid part to stably support the edge wall panels so that they can serve as efficient and effective carrying handles.

Where the carton tray cooperates with an integral or separate carton lid part, the carton tray in addition to the heating and serving function also provides a storage function for the enclosed contents. Where the contents are to be frozen, the stability of the exterior edge wall panels at one pair of opposite side walls is particularly important in conjunction with the perpendicular planar exterior surfaces presented by the other pair of opposite side walls. In most frozen food processing lines, the cartons containing the frozen food must be handled in abutting relation in both directions aligned with both pairs of opposite side walls. The side walls providing perpendicular planar exterior surfaces clearly permit abutment handling in a stable fashion as well as display stacking with the perpendicularly planar exterior side walls disposed in horizontal planes. Similarly, the stabilized exterior edge wall panels permit stable abutment handling in the frozen food line as well as stable multiple carton packaging for shipment.

It is recognized that the patented literature discloses carton constructions for achieving other functions which bear a superficial similarity to the carton tray of the present invention which in its lidded form provides all of the stable handling, transporting, storing, heating and serving functions. For example, U.S. Pat. No. 3,829,004 discloses a carton construction which is provided for absolute fluid tightness for storing deep-frozen products. In this construction, a pair of opposed side walls have side edges which are bent outward at a 90° angle to form closure borders which lie against the inner sides of front and rear side walls so as to make possible a faultless weld by grasping from both sides by welding tongs utilizing heat-sealable material coated on the carton blank.

U.S. Pat. No. 4,836,439 discloses a disposable, collapsible, sleeve-type carton adapted for holding a food item and assisting in browning the surface of the food item in a microwave oven. The collapsible sleeve-type carton is made from a blank which includes a bottom wall panel, four integral side wall panels and four gusset wall panels which, unlike the bent-out side edges of the '004 patent which are integral with only side wall panels, are integral with both adjacent side wall panels. However, contrary to the '004 construction which seeks a fluidtight seal, the '439 carton is provided for a diametrically opposed purpose namely to provide ventilation in either the bottom or sides of the carton tray. Since the '439 carton is a sleeve-type carton, the gusset wall panels integral with both adjacent side walls are provided to enable the carton, when in its open-ended sleeve configuration, to have the open ends closed by the side walls with a snap action provided by the flexure of the integral gusset wall panels in a manner similar to the carton of U.S. Pat. No. 4,130,237, a mode of erection and closure which is quite different from the mode of erection and closure of the carton of the present invention.

Accordingly, it is a further object of the present invention to provide a method of forming a carton tray suitable to retain consumable contents therein containing liquid so that the contents can be (1) heated in an oven while retained therein and (2) thereafter consumed while retained therein. The carton tray is formed from a flat carton blank including a bottom wall panel having a periphery defined by four side fold lines wherein each pair of adjacent side fold lines extend at an angle with respect to each other from a corner point defining one of four corners of the bottom wall panel, four side wall panels integral with the bottom wall panel along the four fold lines and a gusset wall panel integral with each pair of adjacent side wall panels along two end fold lines extending from an associated corner point in angularly related relation with respect to one another. The method comprises progressively folding the side wall panels along the side fold lines in the same direction while progressively folding the gusset wall panels along the angularly related end fold lines in opposite directions with respect to the associated pair of adjacent side wall panels so as to bring the gusset wall panels into surface-to-surface abutting relation with end portions of one of the associated pair of adjacent side wall panels defined by one of the associated two end fold lines, and adhesively adhering the gusset wall panels in surface-to-surface abutting relation with the one side wall end portions to thereby form a sealed integral corner construction between each pair of adjacent side wall panels which is defined (1) exteriorly by the associated gusset wall panel adhesively adhered in abutting relation to the associated one side wall end portion with the associated one end fold line extending generally in the plane of the associated one side wall panel from the associated corner point and (2) interiorly by the other of the associated two end fold lines extending from the associated corner point along the surface of the associated one side wall panel.

While a carton tray with four such corner constructions is particularly suited to retain consumable contents containing liquid so that the contents can be (1) heated in an oven while retained therein, and (2) thereafter consumed while retained therein, in its broadest aspects he invention contemplates a method for forming a carton tray corner construction from a flat carton blank including a bottom wall panel having a periphery defined along two adjacent sides by two side fold lines extending at an angle with respect to each other from a corner point defining a corner of the bottom wall panel, two side wall panels integral with the bottom wall panel along the two fold lines and a gusset wall panel integral with the two side wall panels along two end fold lines extending from the corner point in angularly related relation with respect to one another. The method comprises progressively folding the side wall panels along the side fold lines in the time direction while progressively folding the gusset wall panel along the angularly related end fold lines in opposite directions with respect to the two side wall panels so as to bring the gusset wall panel into surface-to-surface abutting relation with an end portion of one of the two side wall panels defined by one of the two end fold lines, and adhesively adhering the gusset wall panel in surface-to-surface abutting relation with the one side wall end portion to thereby form a sealed integral corner construction between the two side wall panels which is defined (1) exteriorly by the gusset wall panel adhesively adhered in abutting relation to the one side wall end portion with the one end fold line extending generally in the plane of the one side wall panel from the corner point and (2) interiorly by the other of the two end fold lines extending from the corner point along the surface of the one side wall panel.

Another object of the present invention is the provision of a carton tray which is simple in construction, economical to manufacture, and effective in operation.

These and other objects of the present invention will become more apparent during the course of the following detailed description and appended claims.

The invention may best be understood with reference to the accompanying drawings wherein an illustrative embodiment is shown.

IN THE DRAWINGS

Figure 1:
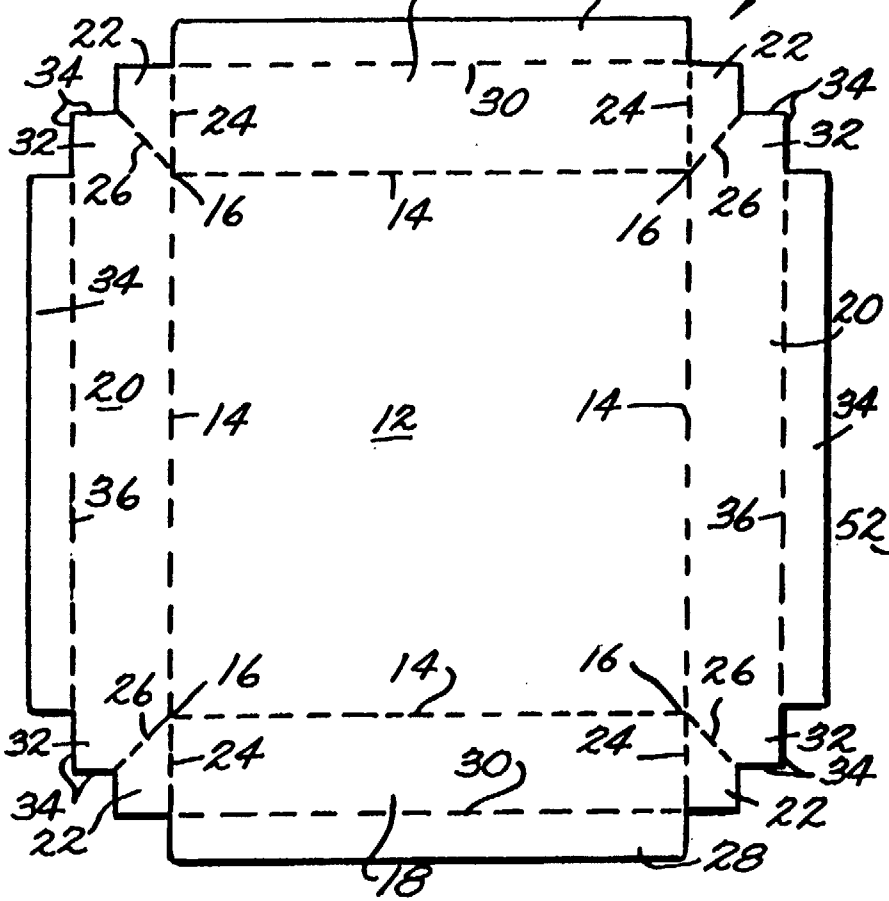
FIG. 1 is a plan view of one embodiment of a carton tray blank erectable into a carton tray embodying the principles of the present invention.

Referring now more particularly to FIG. 1 of the drawings, there is shown therein a carton tray blank, generally indicated at 10, which is erectable in accordance with the principles of the present method to form a carton tray embodying the principles of the present invention. The blank 10 is formed of any suitable carton material as, for example, paperboard. It will be understood that the carton material may be in the form of a laminate, such as a plastic film (e.g., polypropylene or PET) laminated to paperboard. Preferably, the plastic film is on the interior of the paperboard blank although it may be provided on the exterior as well. The laminate may include in selective portions throughout the paperboard material a microwave susceptor material. The susceptor material may either be microwave-interactive or microwave-shielded material.

As shown, the blank material is suitably cut and/or scored to provide a bottom wall panel 12 defined peripherally by four side fold lines 14 defining four corners 16. The carton tray blank 10 also includes first and second pairs of opposite side wall panels 18 and 20 which are integral with the bottom wall panel 12 along the side fold lines 14. The fold lines 14 may be of any desired construction, an exemplary embodiment being regular bar scores as viewed from the side of the blank forming the interior of the carton tray when erected. The side shown in FIG. 1 is also the side of the paperboard blank 10 on which the plastic film is adhered when the blank is made of a laminate.

The carton tray blank 10 also includes four gusset wall panels 22, each of which is integral with two adjacent side wall panels 18 and 20 along two end fold lines 24 and 26 extending from an associated corner 16 in angularly related relation with respect to one another. As shown, the end fold line 24 of each gusset wall panel 22 is integral with an end of one of the first pair of opposed side wall panels 18 and extends from the associated corner 16 with respect to the associated side fold line 14 at an angle of approximately 90°. The end fold lines 24 may exemplarily be formed as reverse bar scores which are offset with respect to the corner 16 a distance equal to the paperboard thickness. The other end fold line 26 of each gusset wall panel 22 is integral with an end of one of the second pair of opposite side wall panels 20 and extends from the associated corner 16 at an angle of approximately 135° with respect to the associated side fold line 14. The end fold lines 26 may exemplarily be regular bar scores the ends of which are spaced slightly from the ends of the fold lines once folded.

The first pair of side wall panels 18 includes edge wall panels 28 formed integrally therewith throughout the width thereof along edge fold lines 30. Each of the second pair of opposite side wall panels 20 includes an outer end portion 32 at each end thereof which is defined by the associated fold line 26 and a pair of angularly related peripheral edges 34. Formed integrally on each of the second pair of opposite side wall panels 20 in the central portion thereof between the outermost edges 34 is an edge wall panel 36 which is integral with the associated side wall panel 20 along an edge fold line 38.

The blank 10 is erectable in accordance with the principles of the present invention into a carton tray, generally indicated at 40, embodying the principles of the present invention. The method of the present invention may be carried out utilizing a plunger and die type apparatus in which the blank 10 is mounted over the die with the bottom wall panel 12 facing in a direction to receive the plunger which is configured to engage substantially the entire bottom wall panel. As the plunger moves downwardly through the die, the side wall panels 18 and 20 progressively engage the sides of the die and are simultaneously progressively folded about the side fold lines 14 in the same direction. Concurrently with the folding movement of the side wall panels 18 and 20, the gusset wall panels 22 are progressively folded along the angularly related end fold lines 24 and 26 in opposite directions with respect to the associated pair of adjacent side wall panels 18 and 20 so as to bring the gusset wall panels 22 into surface-to-surface abutting relation with the end portions 32 of the side wall panels 20 defined by the end fold lines 26 and edges 34. The gusset wall panels 22 are then adhesively adhered in surface-to-surface abutting relation with the end portions 32 to thereby form a sealed integral corner construction, generally indicated at 42, between each pair of adjacent side wall panels 18 and 20 extending outwardly from the side wall panels 18.

When a plunger and die apparatus is utilized to carry out the method of erecting of the present invention, preferably the adhesive adhering procedure is performed at the end of the operative stroke of the plunger during which each corner construction 42 is moved past a pair of cooperating pressure rolls to apply an adhering pressure between the interengaged gusset wall panels and end portions.

The adhesive utilized may be of any type including either heat activated or pressure activated adhesives. The adhesive may be separately applied to the appropriate portions of the carton tray blank 10 prior to erection or during erection. Any suitable adhesive may be utilized, it being understood that where the carton material comprises a laminate including a plastic film on the interior surface of the paperboard, portions of the plastic film itself may constitute the adhesive which is activated by heat preferably by directing a stream of hot air locally thereto just prior to the erecting procedure or the operative stroke of the plunger. The latter constitutes a preferred adhesive embodiment.

It can be seen that each sealed integral corner construction 42 of the carton tray 40 thus erected is defined (1) exteriorly by the associated gusset wall panel 22 adhesively adhered in abutting relation to the associated side wall end portion 32 with the associated end fold line 26 extending generally in the plane of the side wall panel 20 from the associated corner 16 and (2) interiorly by the associated end fold line 24 extending from the associated corner 16 along the surface of the associated side wall panel 20. It will be understood that the end fold lines need not extend exactly from the corner 16. Indeed, as previously stated, it is desirable that the end fold lines 24 be offset to an extent generally equal to the thickness of the blank material and the end fold lines 26 start in closely spaced relation from the corner 16.

Figure 2:
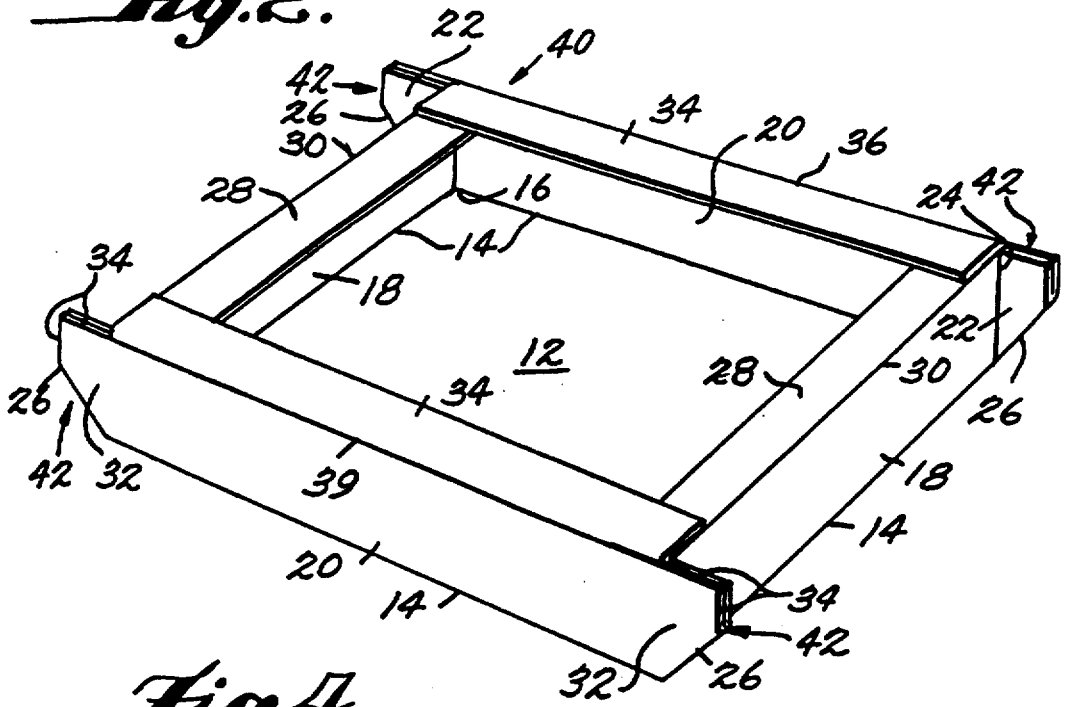
FIG. 2 is a perspective view of the carton tray erected from the carton tray blank shown in FIG. 1.

The edge wall panels 28 and 34 may be folded along their respective edge fold lines 30 and 36 either outwardly or inwardly as shown in FIG. 2. The construction of the fold lines are chosen to be suitable to the direction of the fold. Where both pairs of edge wall panels 28 and 34 are folded inwardly, it is preferable that the edge wall panels 28 are folded inwardly first so that the other edge wall panels 34 are folded so that the end portions thereof overlie the end portions of the edge wall panels 28.

It is preferable in accordance with the principles of the present invention for the carton tray 40 to provide a carton tray part mounted in cooperating relation with a carton lid part to form a carton package containing contents within the space above the bottom wall panel 12 defined by the side wall panels 18 and 20. However, it will be noted that the carton tray 40 by itself functions well as an open top container for retaining in the aforesaid space consumable contents of the type which may contain liquid so that the contents can be (1) heated in an oven while retained therein and (2) thereafter consumed while retained therein. It will be noted that the corner constructions 42 not only provide for an effective integral seal of the space at the corners but the outwardly extending condition of the corner constructions 42 provide handles which enable a user to simply and conveniently carry the carton tray 40 to and from the oven. The oven may either be a conventional oven or a microwave oven, with the utilization in a microwave oven being the most popular and preferred. In this regard, it is desirable to carry the carton tray 40 by simply engaging the outwardly extending corner constructions 42 at any two opposite corners 16.

The carton lid part may either be separate from the carton tray part or integral therewith. The nature of the lid configuration is dependent to a considerable extent on the contents to be enclosed within the carton package. In some instances where the contents are dry and capable of being reconstituted when water is added thereto, a minimum sealing capability of the carton package is required. On the other hand, where the contents contain liquid, it is much more desirable that the lid be sealed with respect to the carton tray. The sealing characteristics desired also has a bearing on whether the edge wall panels 28 and 34 are folded outwardly or inwardly and on whether one or two of the edge wall panels are eliminated. The present invention in its broadest form contemplates the elimination of all of the edge wall panels where the sealing characteristics required are minimal.

There is shown in FIGS. 3–7 two different embodiments of separate carton lid parts which may be provided for cooperation with the carton tray 40. In FIGS. 8–12, there are illustrated carton lid embodiments in which the carton lid part and carton tray part are integral and formed from a single carton blank rather than two separate blanks.

Figure 3:
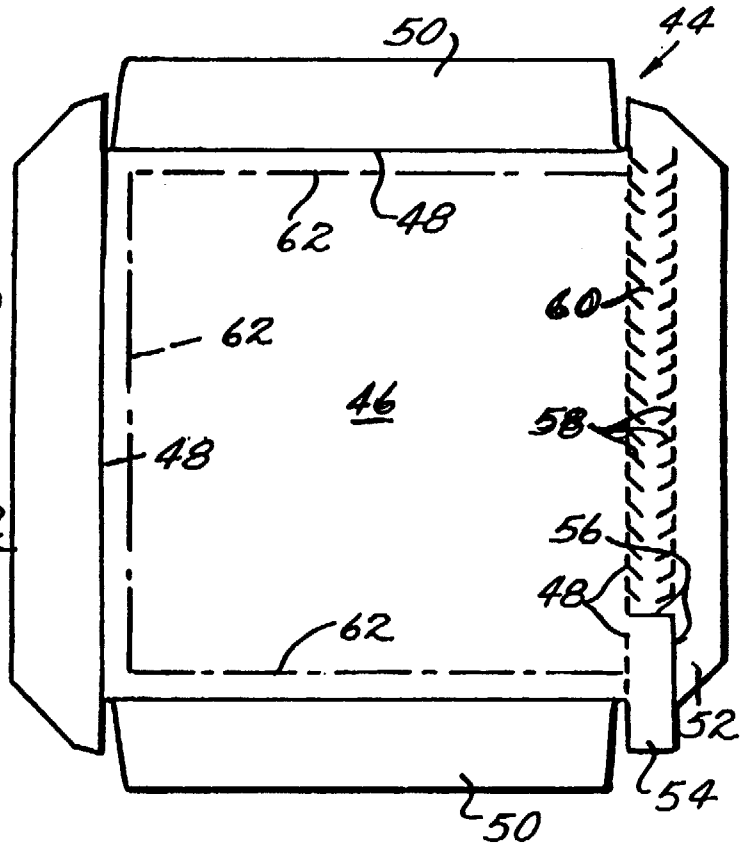
FIG. 3 is a plan view of one embodiment of a separate carton lid blank which is erectable and cooperable with the carton tray of FIG. 2.

Referring now more particularly to FIG. 3, there is shown therein a separate carton lid blank, generally indicated at 44, erectable into a separate carton lid part to cooperate with the carton tray 40. The carton lid blank 44 includes a main lid wall panel 46 having a rectangular configuration similar to the bottom wall panel 20 defined by four fold lines 48. Formed integrally with the lid wall panel 46 along a first pair of opposed fold lines 48 is a first pair of lid flaps 50. The lid flaps 50 are configured to engage the first pair of side wall panels 18 of the carton tray 40. Formed integrally with the lid wall panel 46 along a second pair of opposite fold lines 48 is a second pair of lid flaps 52. The lid flaps 52 are configured to engage the side wall panels 20 of the carton tray 40 including portions coextensive with the end portions 32 thereof.

Preferably, the carton lid part is constructed so as to be simply and conveniently manually disconnectable from the carton tray part to an extent sufficient to provide (1) a vent for the consumable contents when heated in an oven and (2) access to the heated contents when removed from the oven. Preferably, the two functions are desirably performed in sequence. However, it will be understood that an extent of disconnection sufficient to provide access to the heated contents will automatically provide sufficient disconnection for a vent. Consequently, in the broadest aspects of the present invention, the means in the lid part for facilitating manual disconnection of a portion of the lid part from the tray part can be a single means. It is preferred, however, to provide two separate means which are capable of operation in sequence to provide first a vent and then access. Nevertheless, in its broadest aspects, the invention contemplates elimination of facilitating means in favor of venting and access by means of a tool, such as a sharp knife or the like.

The embodiment shown in FIG. 3 illustrates the preferred arrangement. As shown, there is provided a tab 54 at one end of one of the lid flaps 52. The tab 54 is formed by a central cut 56 extending inwardly from the adjacent end of the lid tab 54 and then transversely to the associated fold line 48. Formed in the lid flap as an extension of the tab is a series of parallel cuts 58 defining a pull tab or zip strip 60 within a portion of the associated lid flap 52 adjacent the associated fold line 48. Indeed, the innermost series of cuts 58 form the majority of the associated fold line 48, the remainder of which is a bar score. In this regard the remaining three fold lines 48 are 50% cut lines extending from the exterior surface of the lid part. In addition, the lid wall panel 46 is formed with three 50% cut lines 62 extending from the interior surface, as indicated in phantom lines in FIG. 3, in closely inwardly spaced parallel relation along the other three fold lines associated with the three lid flaps other than the one containing the tab 54 and pull tab 58. The oppositely extending parallel 50% cut lines facilitate delamination between the cut lines in accordance with known practice.

Figure 4:
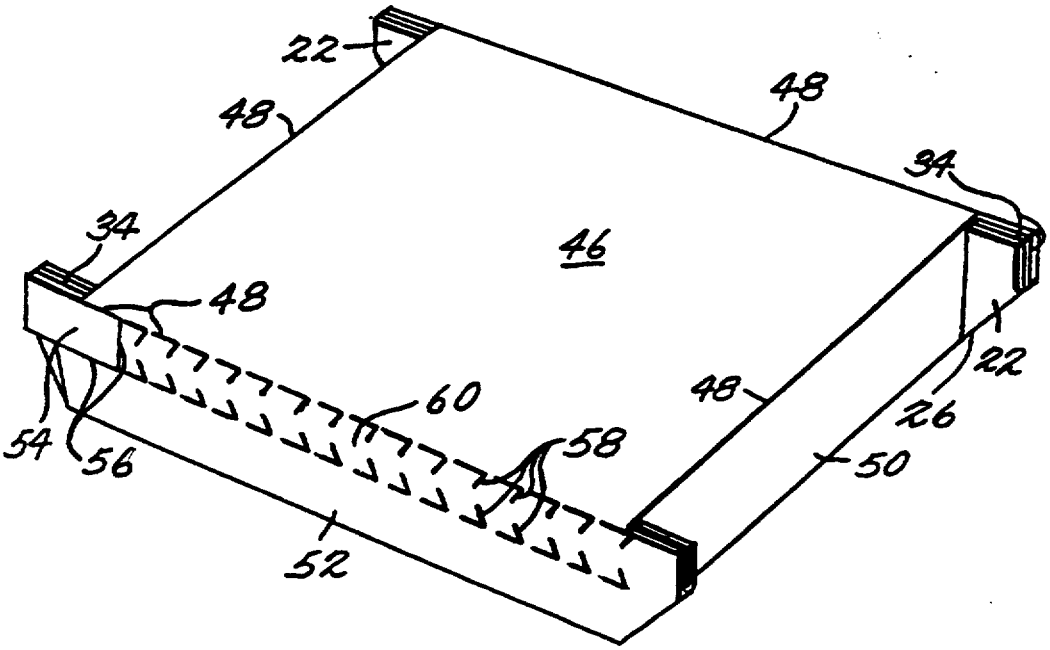
FIG. 4 is a perspective view showing the carton lid erected from the blank shown in FIG. 3 in cooperating relation with the carton tray of FIG. 2.

As best shown in FIG. 4, by erecting the carton lid blank 44 into a lid part and mounting it in cooperating relation with carton tray 40 having suitable contents therein, there is formed a carton package, generally indicated at 64, which embodies the principles of the present invention. The carton package 64 is formed by placing the lid wall panel over the inwardly turned edge wall panels 28 and 34 and simply folding down the first lid flaps 50 into abutting relation with the exterior of the side wall panels 18 and the second lid flaps 52 down into abutting relation with the exterior of the side wall panels 20. The abutting relationships are retained by suitable adhesive or heating the films on the abutting surfaces.

When used, it can be seen that, by grasping the vent tab 54 and pulling up slightly on the same, the adjacent oppositely extending parallel 50% cut lines allow the paperboard forming the carton lid to delaminate. A slight upward movement thus enables the lid wall panel 46 to be deflected upwardly sufficient to provide a vent for heating the contents of the package in an oven, as, for example, a microwave oven. After the contents of the package have been heated in the oven and the package removed from the oven to a table by carrying the same while manually gripping two opposed corner constructions 42, the user can then pull the zip strip 60 which serves to disengage the associated lid flap 52 from the lid wall panel 46. It then becomes a simple matter to continue to remove substantially the entire carton lid wall panel 46 by pulling up on the tab 54 and disconnecting it from the remainder of the package by delamination between the cut lines 48 and 62.

Figure 5:
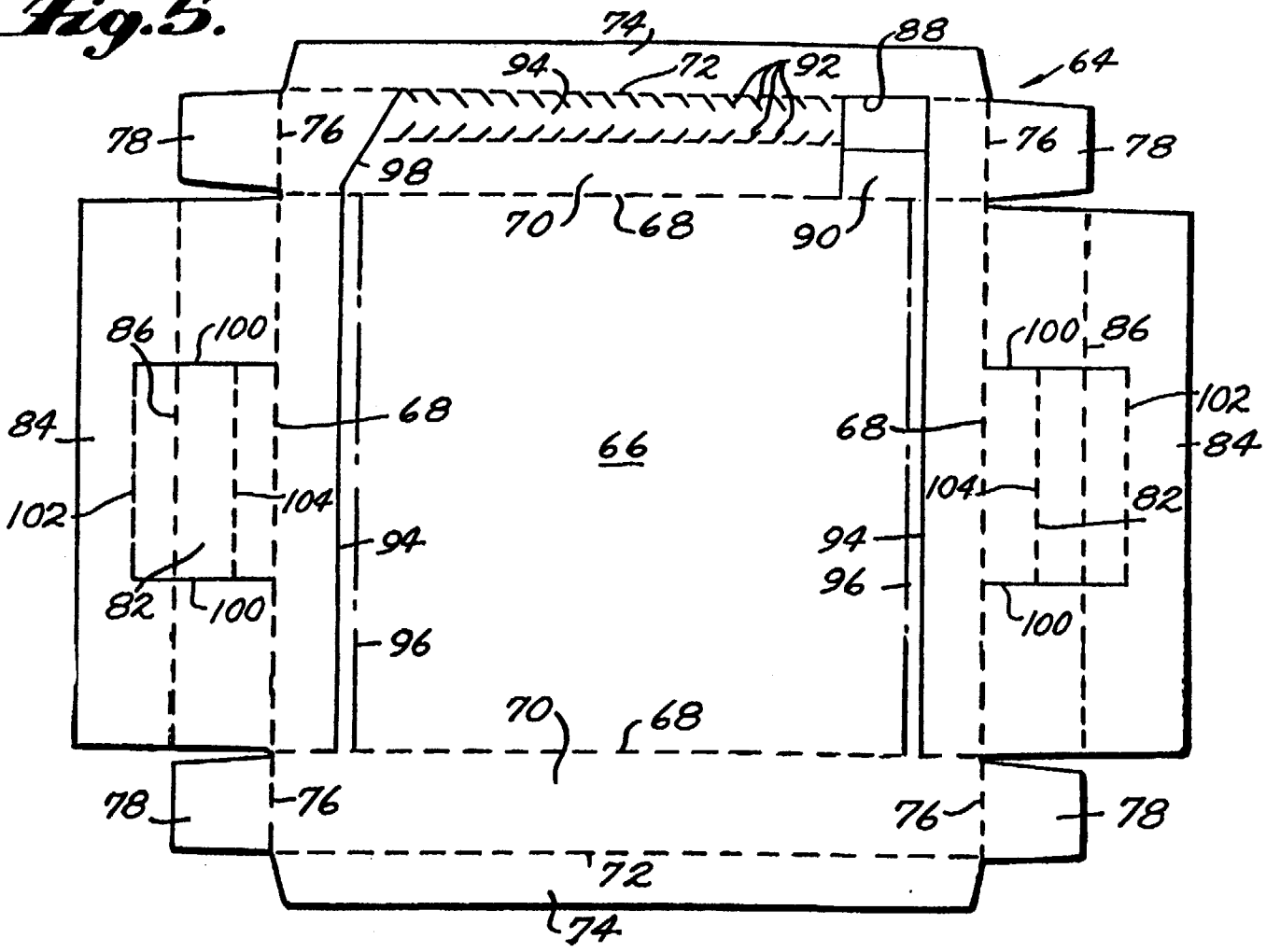
FIG. 5 is a plan view of another form of carton lid blank erectable and cooperable with the carton tray shown in FIG. 2.

Referring now more particularly to FIG. 5, there is shown therein another form of a carton lid blank, generally indicated at 64, erectable so as to cooperate with the carton tray 40. As shown, the carton lid blank 64 includes a main lid wall panel 66 similar to the lid wall panel 46 previously described defined along four peripheral sides by lid fold lines 68. Formed integrally with the lid wall panel 66 along a first pair of opposed fold lines 68 is a first pair of lid side walls 70. The outer periphery of each lid side wall 70 is defined by a flap fold line 72 and a lid flap 74 is integral therewith along the flap fold line 72. Each end of each lid side wall 70 is defined by a tab fold line 76 and a tab 78 is integral with the end of each lid side wall along an associated tab fold line 80.

In addition, the main lid wall panel 66 has a second pair of lid side walls 82 integral therewith along a second pair of lid fold lines 68 and each of these lid side walls 82 has lid flaps 84 integral therewith along lid flap fold lines 86. In addition, one of the lid side wall panels is formed with a cut out portion 88 in one end portion thereof and is formed with parallel cut lines which define a tab 90 along the associated side fold line 68 which may be accessed through the cut out portion 88. A series of parallel cut lines 92 define a pull tab or zip strip 94 along the flap fold line 72 of the lid side wall.

A 50% cut 96 extends from the outer cut defining the tab 90 within the exterior surface of the lid wall panel 66 in parallel relation with the lid fold line 68 of the adjacent lid side wall 82. A parallel 50% cut line 98 is formed on the surface of the blank 64 which constitutes the interior of the lid in parallel relation with the 50% cut line 96. At one end of the zip strip 94, there is a diagonal cut line 98 which extends to the associated lid fold line 68. A second 50% cut line 94 extends from the juncture of the diagonal cut line 97 with the lid fold line 68 in parallel relation to the lid fold line 68 of the adjacent lid side wall 82. A second parallel 50% cut line 96 is formed on the interior surface of the lid wall panel 66.

In erecting and mounting the carton lid blank 64 on the carton tray 40, it will be noted that the lid side walls 70 are folded downwardly along lid fold lines 68 so as to extend in abutting relation with the side wall panels 20 of the carton tray 40 and the lid flaps 74 are folded along flap fold lines 72 under the exterior of the bottom wall panel 12 of the carton tray 40 and suitably glued thereto. The tabs 78 are then folded along their tab fold lines 76 inwardly over the corner constructions 42 of the carton tray 40. Thereafter, the lid side walls 82 are folded along lid fold lines 68 downwardly at right angles and then the lid flaps 84 are folded along flap fold lines 86 inwardly so that marginal free end portions thereof engage the bottom surface of the bottom wall panel 12 of the carton tray 40 and suitably glued thereto.

It is preferable when the carton lid blank 64 is utilized with the carton tray 40 to have the second edge wall panels 34 folded inwardly although they may be folded outwardly if desired. With the outwardly folded arrangement, marginal edge portions of the lid wall panels 70 along the lid fold line 68 will abut the edge wall panels 34 and, if desired, they may be adhesively sealed thereto.

Figure 6:
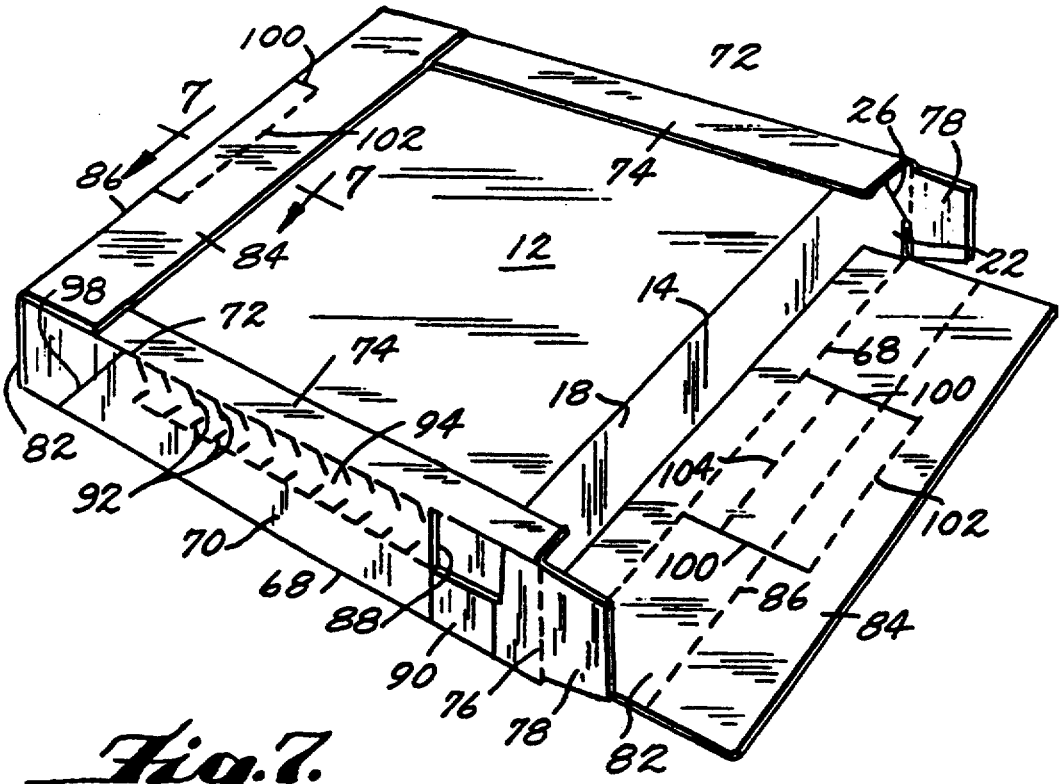
FIG. 6 is a bottom perspective view showing the carton lid partially erected from the blank shown in FIG. 5 and cooperating with the carton tray of FIG. 2.
Figure 7:
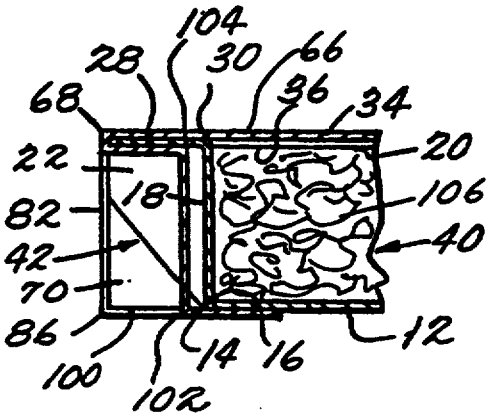
FIG. 7 is a fragmentary sectional view taken along the line 7—7 of FIG. 6.

As best shown at the left in FIG. 6, the downward extension of the lid side walls 82 and the lid flaps 84 adhered to the bottom wall panel 12 of the carton tray 40 provide a support for the ends of the package and provide the package with a full complete four side wall effect. It is within the contemplation of the present invention that these side walls may be used as insulated carrying side walls for the carton package during use. It is also within the contemplation of the present invention to form a pair of parallel cut lines 100 in each of the lid side walls 82 which extend from the lid fold line 68 thereof in perpendicular relation therewith into the associated lid flap 84. The ends of the parallel cut lines 100 in the lid flaps 84 are interconnected by a fold line 102 and an intermediate fold line 104 is formed in the lid side walls 82 between the parallel cut lines 100 so as to present the user with the possibility of deflecting the portions of the lid side walls 82 and associated lid flaps 84 between cut lines 100 inwardly. This relationship is shown in cross-section in FIG. 7 which also shows the option of extending the edge wall panels 28 of the carton tray 40 outwardly. It will be noted that the inwardly deflected portion of the lid side wall 82 between the cut lines 100 and fold lines 68 and 104 at each side underlies the associated outwardly extending edge wall panel 28 of the carton tray 40 and that the remainder of the inwardly deflected portion between the cut lines 100 is spaced from the associated side wall panel 18 of the carton tray 40. This arrangement enables the user to insert his fingers within the hole in the lid side wall panels between the cut lines 100 and to lift and carry the package to and from the oven without fear of contacting any portions of the carton which are heated by virtue of the heated contents shown at 106 in FIG. 7.

The manner of utilizing the vent tab 90 and the pull strip 94 are similar to that previously described. The tab 90 provides for initial venting when pulled up slightly to begin the delamination between the adjacent opposite parallel 50% cut lines 94 and 96. The zip strip 94, when pulled, provides for disconnection of the associated lid side wall 70 between the inner cut defining the tab 90 and diagonal cut line 98 and enables the user to pull back on the released portion to delaminate between the 50% cut lines 94 and 96 and then fold the delaminated portion along the fold line 68 associated with the other lid side wall 70.

It will be understood that the carton lid blank 64 may be modified to eliminate the tabs 78 as well as the lid side walls 82 and associated lid flaps 84. Of course, instead of utilizing the lid flaps 74, the lid side walls 70 could be constructed and adhered to the associated side walls in a manner similar to that previously described. It is also within the contemplation of the present invention to provide a carton lid blank which is in the form of interconnected lid wall panels, side wall panels, and a bottom wall panel with a flap used to mount them as a sleeve which, when opened, can receive the carton tray. If desired, the outwardly extending edge wall panels 28 of the carton tray 40 could be sealed to the marginal edge portions of the lid wall panel of such a sleeve arrangement. In the arrangements described above, it is preferable that the edge wall panels 34 associated with the side wall panels 20 be retained in their inwardly extending relation. However, it is within the contemplation that these edge wall panels could be folded outwardly and then adhered in abutting relation with the associated lid side walls 52 and 70 and folded downwardly therewith.

Figure 8:
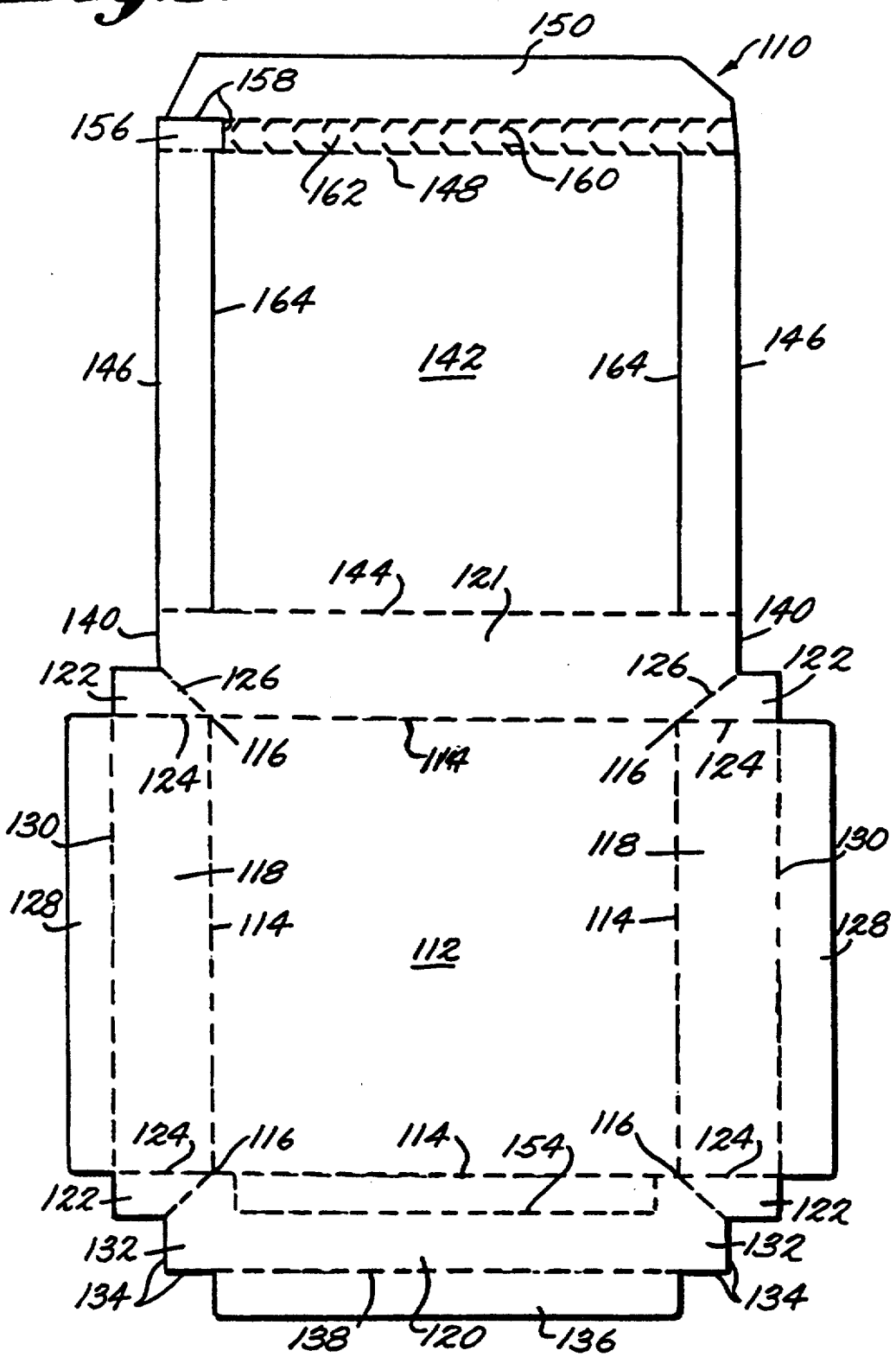
FIG. 8 is a plan view of one embodiment of a combined carton tray and carton lid blank erectable into a carton embodying the principles of the present invention.

Referring now more particularly to FIG. 8 of the drawings, there is shown therein a combined carton tray and lid blank, generally indicated at 110, which is erectable in accordance with the principles of the present method to form a carton embodying the principles of the present invention. As shown, the blank material, which is the same as the material of blank 10, is suitably cut and/or scored to provide a bottom wall panel 112 defined peripherally by four side fold lines 114 defining four corners 116. The carton tray part of the blank 110 includes a first pair of opposite side wall panels 118 which are integral with the bottom wall panel 112 along two opposed side fold lines 114. The carton tray part of the blank 110 also includes a second pair of opposite side wall panels in the form of a front side wall panel 120 and a rear side wall panel 121. As before, the fold lines 114 may be of any desired construction, an exemplary embodiment being regular bar scores as viewed from the side of the blank forming the interior of the carton when erected. The side shown in FIG. 8 is also the side of the paperboard blank 110 on which the plastic film is adhered when the blank is made of a laminate, as is preferred.

The carton tray part of the blank 110 also includes four gusset wall panels 122, each of which is integral with two adjacent side wall panels 118 and 120 or 121 along two end fold lines 124 and 126 extending from an associated corner 116 in angularly related relation with respect to one another. As shown, the end fold line 124 of each gusset wall panel 122 is integral with an end of one of the first pair of opposed side wall panels 118 and extends from the associated corner 116 with respect to the associated side fold line 114 at an angle of approximately 90°. The end fold lines 124 may exemplarily be formed as reverse bar scores which are offset with respect to the corner 116 a distance equal to the paperboard thickness. The other end fold line 126 of each gusset wall panel 122 is integral with an end of one of the second pair of opposite side wall panels 120 or 121 and extends from the associated corner 116 at an angle of approximately 135° with respect to the associated side fold line 114. The end fold lines 126 may exemplarily be regular bar scores the ends of which are spaced slightly from the ends of the fold lines once folded.

The first pair of side wall panels 118 includes edge wall panels 128 formed integrally therewith throughout the width thereof along edge fold lines 130. Preferably, the fold lines 130 are reverse bar scores to enable the edge wall panels 128 to be easily folded outwardly. The front and rear side wall panels 120 each includes an outer end portion 132 at each end thereof which is defined in part by the associated fold line 126. In the case of the front side wall panel 120, a pair of angularly related peripheral edges 134 define the remainder of the ends. Formed integrally on the front side wall panel 120 in the central portion thereof between the outermost edges 134 is a front edge wall panel 136 which is integral with the front side wall panel 120 along an edge fold line 138. Fold line 138 preferably is a regular bar score enabling the front edge wall panel 136 to be easily folded inwardly.

The rear side wall panel 121 has the remainder of its ends defined by a single transversely extending edge 140. Formed integrally with the rear side wall panel 121 between the transverse edges 140 is a lid wall panel 142. A fold line 144 delineates the rear side wall panel 121 from the lid wall panel 142. Preferably, the fold line 144 is a line of reverse perforations 3/16" in length spaced apart 1/16". This construction provides a seal when the lid wall panel 142 is folded with respect to the rear side wall panel 121 and facilitates the separation of the lid wall panel 142 from the rear side wall panel 121 if desired when final access is obtained.

The lid wall panel 142 is defined on two opposite sides by side edges 146 extending from the edges 140 of the rear side wall panel 121. The side of the lid wall panel 142 opposite the fold line 144 is defined by a fold line 148 which delineates one side of a rectangular front lid flap 150 integral with the lid wall panel 142.

Figure 9:
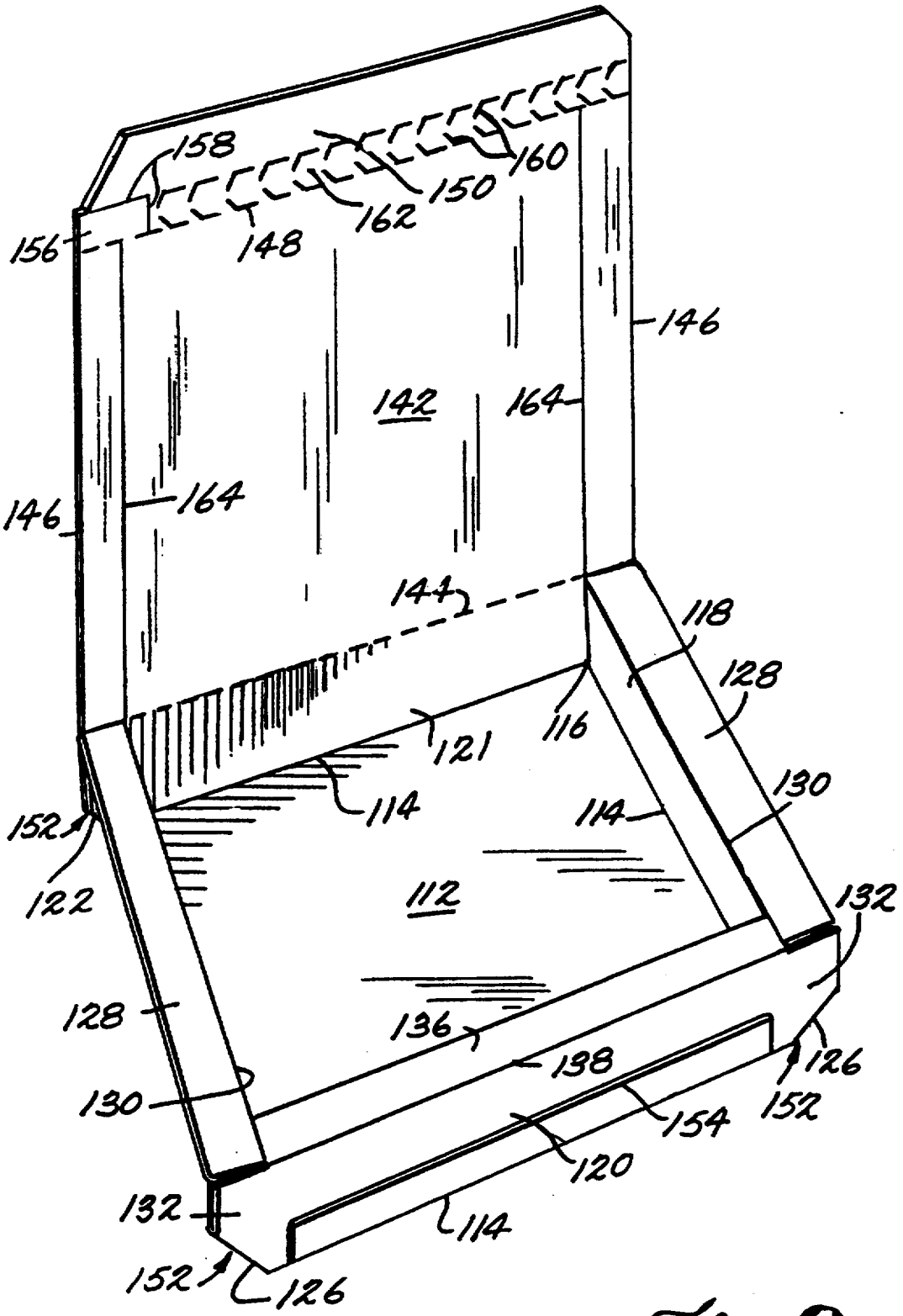
FIG. 9 is a perspective view of the carton erected from the blank shown in FIG. 8 with the carton lid shown in an open position.

The manner in which the blank 110 is erected to provide a carton tray part with a lid part in an open position such as shown in FIG. 9 is essentially the same manner as the carton tray blank 10 is erected. When thus erected, the lid wall panel 142 and front lid flap 150 extend in the same plane as the rear side wall panel 121. Thereafter, each edge wall panel 128 is folded outwardly, as shown in FIG. 9, so as to extend between the upper ends of the associated outwardly extending pair of corner constructions 152 similar to corner constructions 42. Thereafter, the front edge wall panel 136 is folded inwardly. After the interior of the carton tray part is provided with suitable contents, the lid wall panel 142 is folded downwardly and opposite marginal edge portions of the lid wall panel along side edges 146 are adhesively sealed with the outwardly extending edge wall panels 128 as by heating the abutting film laminates.

The front lid flap 150 is then folded downwardly into abutting engagement with the front side wall panel 120. In this regard, it will be noted that the portion of the front side wall panel 120 along fold line 114 thereof is preferably embossed, as indicated at 154, in a direction outwardly with respect to the exterior surface thereof so as to facilitate abutment with the lid flap 150 along its free marginal edge portion. A suitable adhesive is provided between the exterior surface of the embossment 154 of the front side wall panel 120 and the lid flap 150.

When the carton lid part is thus closed with respect to the carton tray part to form a carton package, it will be noted that at each end of the carton package, the outwardly extending edge wall panels 128 and adhered marginal edge portions of the lid wall panel 142 provide convenient carrying handles which are stabilized by the corner constructions 152 at the ends thereof which, in turn, are stabilized at the rear by virtue of the ends of the fold line 144 and at the front by the ends of fold line 148 and the ends of lid flap 150.

Preferably, the carton lid part is provided with means to facilitate manual separation of a sufficient portion of the carton lid part from the carton tray part to provide a heating vent for the contents and eating access to the heated contents. As before, the facilitating means may be of any known construction. A tab and zip strip arrangement similar to that previously described is shown. To this end, the front lid flap 150 is provided with a tab 156 at one end thereof.

The tab 156 is formed by a central cut 158 extending inwardly from the adjacent end of the lid tab 156 and then transversely to the associated fold line 148. Formed in the lid flap 150 as an extension of the tab 156 is a series of parallel cuts 160 defining a pull tab or zip strip 162 within a portion of the associated lid flap 150 adjacent the associated fold line 138. As before, the innermost series of cuts 160 form the majority of the associated fold line 148, the remainder of which is a bar score. As best shown in FIG. 9, the marginal edge portions of the lid wall panel 148 adhered to the edge wall panels 128 are delineated by parallel 50% cut lines 164 extending from the interior surface of the lid wall panel 148.

When used, it can be seen that, by grasping the vent tab 156 and pulling up slightly on the same, the adjacent 50% cut line 164 allows the paperboard forming the carton lid part to delaminate between the cut line 164 and the adjacent side edge 146. A slight upward movement thus enables the lid wall panel 142 to be deflected upwardly sufficient to provide a vent for heating the contents of the package in a microwave oven. After the contents of the package have been heated in the oven and the package removed from the oven to a table by carrying the same while manually gripping two opposed handles between corner constructions 152, the user can then pull the zip strip 162 which serves to disengage the associated lid flap 150 from the lid wall panel 142. It then becomes a simple matter to continue to remove substantially the entire carton lid wall panel 142 by pulling up on the tab 156 and disconnecting it from the remainder of the carton package by delamination between the cut lines 164 and side edges 146.

Figure 10:
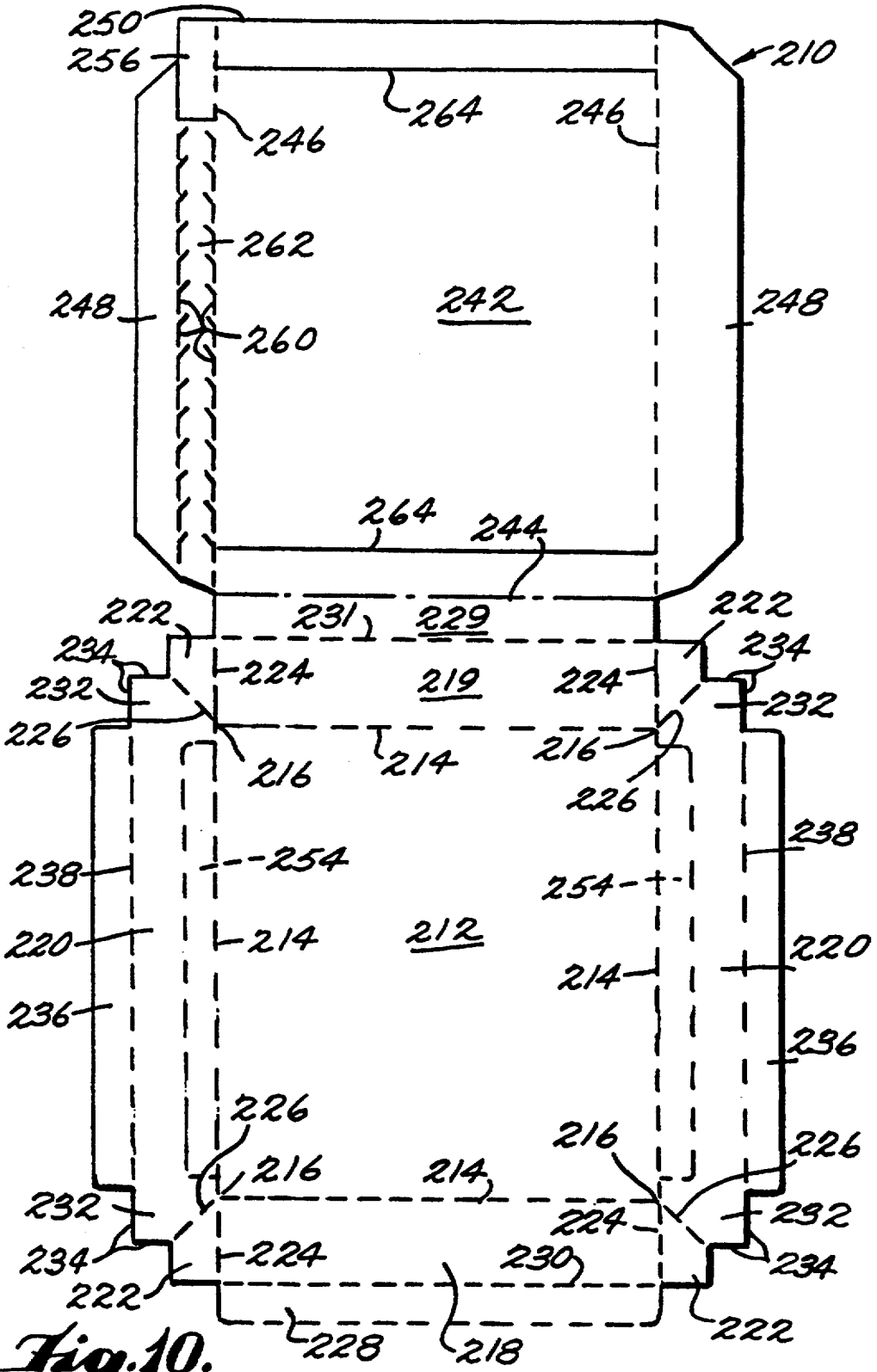
FIG. 10 is a view similar to FIG. 8 of another embodiment of a combined carton tray and lid blank erectable into a carton embodying the principles of the present invention.

Referring now more particularly to FIG. 10 of the drawings, there is shown therein another embodiment of a combined carton tray and lid blank, generally indicated at 210, which is erectable in accordance with the principles of the present method to form a carton embodying the principles of the present invention. As shown, the blank material, which is the same as the material of blanks 10 and 110, is suitably cut and/or scored to provide a bottom wall panel 212 defined peripherally by four side fold lines 214 defining four corners 216. The carton tray part of the blank 210 includes a first pair of opposite side wall panels 218 in the form of a front side wall panel 220 and rear side wall panel 220. The front and rear side wall panels are integral with the bottom wall panel 212 along two opposed side fold lines 214. The carton tray part of the blank 210 also includes a second pair of opposite side wall panels 220. As before, the fold lines 214 may be of any desired construction, an exemplary embodiment being regular bar scores as viewed from the side of the blank forming the interior of the carton when erected. The side shown in FIG. 10 is also the side of the paperboard blank 210 on which the plastic film is adhered when the blank is made of a laminate, as is preferred.

The carton tray part of the blank 210 also includes four gusset wall panels 222, each of which is integral with two adjacent side wall panels 218 and 219 or 220 along two end fold lines 224 and 226 extending from an associated corner 216 in angularly related relation with respect to one another. As shown, the end fold line 224 of each gusset wall panel 222 is integral with an end of one of the first pair of opposed side wall panels 218 and 219 and extends from the associated corner 216 with respect to the associated side fold line 214 at an angle of approximately 90°. The end fold lines 224 may exemplarily be formed as reverse bar scores which are offset with respect to the corner 216 a distance equal to the paperboard thickness. The other end fold line 226 of each gusset wall panel 222 is integral with an end of one of the second pair of opposite side wall panels 220 and extends from the associated corner 216 at an angle of approximately 135° with respect to the associated side fold line 214. The end fold lines 226 may exemplarily be regular bar scores the ends of which are spaced slightly from the ends of the fold lines once folded.

The front and rear side wall panels 218 and 219 include front and rear edge wall panels 228 and 229 respectively formed integrally therewith throughout the width thereof along front and rear edge fold lines 230 and 231 respectively. Preferably, the fold lines 230 are reverse bar scores to enable the edge wall panels 228 and 229 to be easily folded outwardly. Each side wall panel 220 includes an outer end portion 232 at each end thereof which is defined in part by the associated fold line 226. The remainder of the ends of the side wall panels 220 are desired by a pair of angularly related peripheral edges 234. Formed integrally on each side wall panel 220 in the central portion thereof between the outermost edges 234 is an edge wall panel 236 which is integral with the associated side wall panel 220 along an edge fold line 238. Fold line 238 preferably is a regular bar score enabling the edge wall panels 236 to be easily folded inwardly.

Formed integrally with the rear edge wall panel 229 throughout the width thereof is a lid wall panel 242. A fold line 244 delineates the rear edge wall panel 229 from the lid wall panel 242. Preferably, the fold line 244 is a line of reverse 50% cut line.

The lid wall panel 242 is defined on two opposite sides by lid fold lines 246 extending from the ends of the edge side wall panel 229. Lid fold lines 246 serve to delineate a pair of integral lid flaps 248. The front side of the lid wall panel 242 opposite the fold line 244 is defined by free edge 250.

The blank 210 is erected to provide a carton tray part with the edge wall panels 236 extending in the plane of side wall panels 220, the front edge wall panel 228 in the plane of front wall panel 218, the rear edge wall panel 229, the lid wall panel 242 in the plane of side wall panel 219 and the lid flaps 248 folded forwardly when utilizing a plunger and die arrangement.

Figure 11:
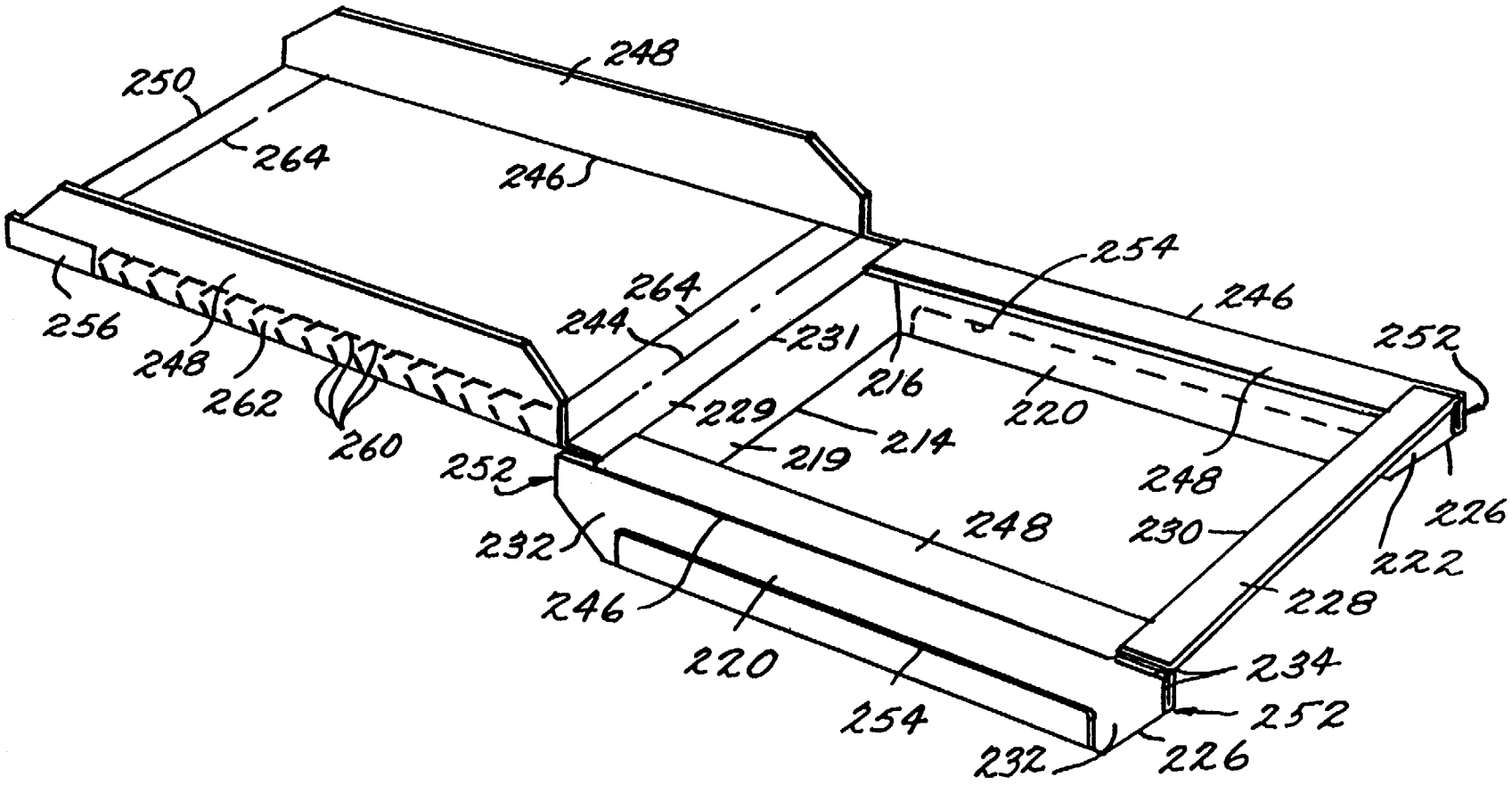
FIG. 11 is a perspective view of the carton erected from the blank shown in FIG. 10 with the carton lid shown in an open position.

The carton tray part is erected in the manner previously described. Thereafter, the front edge wall panel 228 is folded outwardly and the rear edge panel 229 together with the lid wall panel 242 likewise is folded outwardly, as shown in FIG. 11, so as to extend between the upper ends of the associated outwardly extending pair of corner constructions 252 similar to corner constructions 42 and 152. Thereafter, the edge wall panels 236 are folded inwardly. After the interior of the carton tray part is provided with suitable contents, the lid wall panel 242 is folded forwardly and downwardly and opposite marginal edge portions of the lid wall panel 242 along lid fold line 244 and side edge 249 are adhesively sealed with the outwardly extending front and rear edge wall panels 228 and 229 as by heating the abutting film laminates.

The side lid flaps 248 are then moved into abutting engagement with the side wall panels 220. In this regard, it will be noted that the portions of the side wall panels 220 along fold lines 214 are preferably embossed, as indicated at 254, in a direction outwardly with respect to the exterior surface thereof so as to facilitate abutment with the lid flaps 248 along their free marginal edge portions. A suitable adhesive is provided between the exterior surface of the embossments 254 of the side wall panels 220 and the lid flaps 248.

When the carton lid part is thus closed with respect to the carton tray part to form a carton package, it will be noted that, at the front and rear of the carton package, the outwardly extending edge wall panels 228 and 229 and adhered marginal edge portions of the lid wall panel 242 provide convenient carrying handles which are stabilized by the corner constructions 252 at the ends thereof which, in turn, are stabilized by virtue of the ends of the fold lines 246 and the ends of lid flaps 248.

As before, the carton lid part is provided with means to facilitate manual separation of a sufficient portion of the carton lid part from the carton tray part to provide a heating vent for the contents and eating access to the heated contents. As before, the facilitating means may be of any known construction. As before, a tab and zip strip arrangement similar to that previously described is shown. To this end, one of the lid flaps 248 is provided with a tab 256 at the front end thereof.

The tab 256 is formed by a central cut 258 extending inwardly from the adjacent front end of the lid tab 256 and then transversely to the associated fold line 246. Formed in the one lid flap 248 as an extension of the tab 256 is a series of parallel cuts 260 defining a pull tab or zip strip 262 within a portion of the associated lid flap 248 adjacent the associated fold line 246. As before, the innermost series of cuts 260 form the majority of the associated fold line 246, the remainder of which is a bar score. As best shown in FIGS. 10 and 11, the marginal edge portions of the lid wall panel 242 adhered to the edge wall panels 228 and 229 are delineated by parallel 50% cut lines 264 extending from the interior surface of the lid wall panel 242. Preferably, the fold line 246 associated with the other lid flap 248 which does not have the tab 254 and zip strip 262 is a line of reverse perforations 3/16" in length spaced apart 1/16". This construction provides a seal when the lid wall panel 242 is closed and facilitates the separation of the lid wall panel 242 from the associated lid flap 248 if desired when final access is obtained.

When used, it can be seen that, by grasping the vent tab 256 and pulling up slightly on the same, the adjacent 50% cut line 264 allows the paperboard forming the carton lid part to delaminate between the cut line 264 and the adjacent free edge 250. A slight upward movement thus enables the lid wall panel 242 to be deflected upwardly sufficient to provide a vent for heating the contents of the package in a microwave oven. After the contents of the package have been heated in the oven and the package removed from the oven to a table by carrying the same while manually gripping two opposed handles between corner constructions 252, the user can then pull the zip strip 262 which serves to disengage the associated lid flap 248 from the lid wall panel 242. It then becomes a simple matter to continue to remove substantially the entire carton lid wall panel 242 by pulling up on the tab 256 and disconnecting it from the remainder of the carton package by delamination between the cut liens 264 and side edge 250 and the opposite 50% cut line defining the fold line 244.

It will be seen that the objects of this invention have been fully and effectively accomplished. It will be realized that the foregoing preferred specific embodiment has been shown and described for the purpose of this invention and is subject to change without departure from such principles. This invention includes all modifications encompassed within the spirit and scope of the following claims.

What is claimed is:

1. A carton tray suitable to retain consumable contents therein containing liquid so that the contents can be (1) heated in an oven while retained therein and (2) thereafter consumed while retained therein, said carton tray being formed from a flat carton blank including a bottom wall panel having a periphery defined along four sides by four side fold lines interrelated so that there are four different pairs of adjacent side fold lines wherein each pair of adjacent side fold lines extends at an angle with respect to each other from a corner point defining one of four corners of said bottom wall panel, four side wall panels integral with said bottom wall panel along said four side fold lines interrelated so that there are four different pairs of adjacent side wall panels, a gusset wall panel integral with each pair of adjacent side wall panels along two end fold lines extending in angularly related relation with respect to one another from the corner point associated with the pair of adjacent fold lines with which said pair of adjacent side wall panels is integral,

*each of said gusset wall panels being defined by the two end fold lines extending from the associated corner point and a free peripheral edge extending between ends of the two end fold lines remote from the associated corner point,* said side wall panels being folded along said side fold lines in a direction which is the same relative to said bottom wall panel into an erected position while each of said gusset wall panels is folded along the associated angularly related end fold lines in opposite directions with respect to the associated pair of adjacent side wall panels so as to bring each gusset wall panel into surface-to-surface abutting relation with an end portion of one of the associated pair of adjacent side wall panels defined by one of the associated two end fold lines, and an adhesive adhering each of said gusset wall panels in surface-to-surface abutting relation with the associated one side wall end portion to thereby form a sealed integral corner construction between each pair of adjacent side wall panels which is defined (1) exteriorly by the associated gusset wall panel adhesively adhered in abutting relation to the associated one side wall end portion with the associated one end fold line extending generally in a plane coincident with an interior surface of the associated one side wall panel from the associated corner point and (2) interiorly by another of the associated two end fold lines extending from the associated corner point generally along the interior surface of the associated one side wall panel.

2. A carton tray as defined in claim 1 wherein said four side wall panels include first and second pairs of opposed side wall panels, said side wall end portions being provided at opposite ends of said second pair of opposed side wall panels so that said integral sealed corner constructions extend outwardly from opposite ends of said first pair of opposed side wall panels, said first pair of opposed side wall panels having first edge wall panels integral therewith along first edge fold lines parallel with the side fold lines associated with said first pair of opposed side wall panels, said first edge wall panels being folded along said first edge fold lines so as to extend in generally parallel relation with respect to said bottom wall panel.

3. A carton tray as defined in claim 2 wherein said second pair of opposed side wall panels have second edge wall panels integral therewith along second edge fold lines generally parallel with the side fold lines associated with said first pair of opposed side wall panels, said second edge wall panels being folded along said second edge fold lines so as to extend in generally parallel relation with said bottom wall panel.

4. A carton tray as defined in claim 3 wherein said first edge wall panels are folded inwardly and said second edge wall panels are folded inwardly with end portions of said second edge wall panels overlying end portions of said first edge wall panels.

5. A carton tray as defined in claim 4 wherein said carton tray forms a carton tray part of a carton package which includes a carton lid part having a lid wall panel with four lid flaps hinged to said lid wall panel, said four lid flaps being adhesively adhered in surface-to-surface engagement with said four side wall panels with said lid wall panel disposed in generally parallel relation with said bottom wall panel so as to enclose consumable contents therebetween within said four side wall panels, said carton lid part having cuts therein enabling the carton lid part to be manually disconnectable from said carton tray part to an extent sufficient to provide (1) a vent for the consumable contents when heated in an oven and (2) access to the heated contents when removed from the oven.

6. A carton tray as defined in claim 2 wherein said carton tray forms a carton tray part of a carton package which includes a carton lid part having a lid wall panel disposed in generally parallel relation with said bottom wall panel so as to enclose consumable contents therebetween within said four side wall panels, said lid wall panel having marginal edge portions extending outwardly from said first pair of opposed side wall panels in generally outwardly coextensive relation with said integral sealed corner constructions, said carton package being constructed so that (1) the corner constructions and lid wall panel marginal edge portions are (A) stabilized for handling and shipping, (2) the carton package can be (A) oriented in a display position wherein said second opposed pair of side wall panels extend in generally vertically spaced horizontal relation and (B) supported in said display position in a guided stable fashion on a similar carton package in a similar display position, and (3) the portions of the carton package extending outwardly from the first pair of opposed side wall panels provide stable handles for enabling the carton package to be conveniently manually carried to and from a heating oven.

7. A carton package as defined in claim 6 wherein said carton lid part includes means for facilitating manual disconnection of a portion of said lid wall panel from said carton tray part to an extent sufficient to provide (1) a vent for the consumable contents when heated in an oven and (2) access to the heated contents when removed from the oven.

8. A carton package as defined in claim 7 wherein said carton lid part includes four lid side walls integral with said lid wall panel along four lid fold lines and four lid flaps integral with said lid side walls along parallel flap fold lines, said four lid side walls including two opposed lid side walls folded into abutting relation with said second pair of opposed side wall panels, said four lid flaps including two lid flaps associated with said two opposed lid side walls folded under said bottom wall panel and adhered thereto, a tab hinged to opposite ends of each of said two opposed lid side walls, each of said tabs being folded inwardly over one of said corner constructions, said four lid side walls including a remaining two lid side walls folded downwardly so that the ends of said remaining two lid side walls engage said tabs, said four lid flaps including a remaining two lid flaps associated with said remaining two side walls, said remaining two end flaps being folded under the carton tray bottom wall panel and adhered thereto.

9. A carton package as defined in claim 8 wherein said remaining two of said lid side wall panels each having a pair of parallel cuts formed therein extending from the associated lid fold line in a direction generally perpendicular thereto and into the associated lid flap so as to define an angular portion therebetween capable of being manually deflected inwardly to provide a handle underlying central areas of the marginal edge portions of said lid wall panel.

10. A carton tray as defined in claim 7 wherein said first edge wall panels extend outwardly between the corner constructions extending outwardly of the ends of said first pair of side wall panels in generally outwardly coextensive relation with said corner constructions and in adhered underlying relation to the marginal edge portions of said lid wall panel.

11. A carton tray as defined in claim 10 wherein said lid wall panel is integral with a rear one of said second pair of opposite side wall panels along a rear lid fold line parallel with the side fold line associated with said rear side wall panel.

12. A carton tray as defined in claim 11 wherein said carton lid part includes a front lid flap integral with said lid wall panel along a front lid front line, said front lid flap being folded down in abutting relation with a front one of said second pair of opposed side wall panels and adhered to said front side wall panel.

13. A carton tray as defined in claim 12 wherein said front side wall panel has an exterior embossment therein to facilitate the adhered abutting relation with said front lid flap.

14. A carton package as defined in claim 12 wherein said front side wall panel is integral with a front edge wall panel along a front edge fold line parallel with the side fold line associated with said front side wall panel, said front edge wall panel being folded inwardly to underlie said lid wall panel.

15. A carton package as defined in claim 14 wherein said manually disconnecting facilitating means includes 50% cut lines in an interior side of said lid wall panel delineating the marginal edge portions thereof for causing said marginal edge portions to delaminate in response to a manual lifting of said lid wall panel.

16. A carton package as defined in claim 10 wherein said lid wall panel is integral with a rear one of said first edge wall panels along a rear lid fold line (1) parallel with a rear one of said edge fold lines and (2) adjacent a rear one of the marginal edge portions of said lid wall panel.

17. A carton package as defined in claim 16 wherein said carton lid part includes a pair of opposed lid flaps integral with a pair of opposed lid fold lines, said pair of opposed lid flaps being folded downwardly into abutting relation with said second pair of opposed side wall panels and adhered thereto.

18. A carton package as defined in claim 17 wherein said second pair of opposed side wall panels have exterior embossments therein to facilitate the adhered abutting relationship of said pair of lid flaps.

19. A carton package as defined in claim 18 wherein said manually disconnecting facilitating means includes 50% cut lines in an interior side of said lid wall panel delineating the marginal edge portions thereof for causing said marginal edge portions to delaminate in response to a manual lifting of said lid wall panel.

20. A carton package as defined in claim 10 wherein said manually disconnecting facilitating means includes 50% cut lines in an interior side of said lid wall panel delineating the marginal edge portions thereof for causing said marginal edge portions to delaminate in response to a manual lifting of said lid wall panel.

21. A method of forming a carton tray suitable to retain consumable contents therein containing liquid so that the consumable contents can be (1) heated in an oven while retained therein and (2) thereafter consumed while retained therein, said carton tray being formed from a flat carton blank including a bottom wall panel having a periphery defined by four side fold lines interrelated so that there are four different pairs of adjacent side fold lines wherein each pair of adjacent side fold lines extend at an angle with respect to each other from a corner point defining one of four corners of said bottom wall panel, four side wall panels integral with said bottom wall panel along said four fold lines interrelated so that there are four different pairs of adjacent side wall panels and a gusset wall panel integral with each pair of adjacent side wall panels along two end fold lines extending in angularly related relation with respect to one another from the corner point associated with the pair of adjacent fold lines with which said pair of adjacent side wall panels is integral,

*each of said gusset wall panels being defined by the two end fold lines extending from the associated corner point and a free peripheral edge extending between ends of the two end fold lines remote from the associated corner point,* said method comprising progressively folding said side wall panels along said side fold lines in a direction which is the same relative to said bottom wall panel while progressively folding said gusset wall panels along said angularly related end fold lines in opposite directions with respect to the associated pair of adjacent side wall panels so as to bring said gusset wall panels into surface-to-surface abutting relation with end portions of one of the associated pair of adjacent side wall panels defined by one of the associated two end fold lines, and adhesively adhering said gusset wall panels in surface-to-surface abutting relation with said one side wall end portions to thereby form a sealed integral corner construction between each pair of adjacent side wall panels which is defined (1) exteriorly by the associated gusset wall panel adhesively adhered in abutting relation to the associated one side wall end portion with the associated one end fold line extending generally in a plane coincident with an interior surface of the associated one side wall panel from the associated corner point and (2) interiorly by another of the associated two end fold lines extending from the associated corner point generally along the interior surface of the associated one side wall panel, *said method being performed by moving a plunger through an operative stroke in cooperating relation with a fixed die during which the plunger engages the bottom wall panel of the flat carton blank and moves the bottom wall panel through the die to effect the progressive folding of the side wall panels as aforesaid while progressively folding said gusset wall panels as aforesaid, the adhesive adhering of said gusset wall panels as aforesaid including a progressive application of adhesive adhering pressure to the integral corner constructions as aforesaid during the operative stoke of the plunger.*

22. A method as defined in claim 21 wherein said flat carton blank is formed of a laminate comprising paper board and a film of plastic material, said film of plastic material providing the adhesive for adhering said gusset wall panels to said end portions.

23. A method as defined in claim 22 wherein said film of plastic material is locally heated by applying hot air thereto to provide the adhesive for adhering said gusset wall panels to said end portions.

24. A method of forming a carton tray corner construction from a flat carton blank including a bottom wall panel having a periphery defined along two adjacent sides by two side fold lines extending at an angle with respect to each other from a corner point defining a corner of said bottom wall panel, two side wall panels integral with said bottom wall panel along said two fold lines and a gusset wall panel integral with the two side wall panels along two end fold lines extending from the corner point in angularly related relation with respect to one another, *said gusset wall panels being defined by the two end fold lines extending from said corner point and a free peripheral edge extending between ends of the two end fold lines remote from said corner point,* said method comprising progressively folding said side wall panels along said side fold lines in the same direction while progressively folding said gusset wall panel along said angularly related end fold lines in opposite directions with respect to the two side wall panels so as to bring said gusset wall panel into surface-to-surface abutting relation with an end portion of one of said two side wall panels defined by one of said two end fold lines, and adhesively adhering said gusset wall panel in surface-to-surface abutting relation with said one side wall end portion to thereby form a sealed integral corner construction between said two side wall panels which is defined (1) exteriorly by the gusset wall panel adhesively adhered in abutting relation to the one side wall end portion with the one end fold line extending generally in a plane coincident with an interior surface of said one side wall panel from said corner point and (2) interiorly by another of said two end fold lines extending from said corner point generally along the interior surface of said one side wall panel,

*said method being performed by moving a plunger through an operative stroke in cooperating relation with a fixed die during which the plunger engages the bottom wall panel of the flat carton blank and moves the bottom wall panel through the die to effect the progressive folding of the side wall panels as aforesaid while progressively folding said gusset wall panel as aforesaid, the adhesive adhering of said gusset wall panel as aforesaid including a progressive application of adhesive adhering pressure to the integral corner constructions as aforesaid during the operative stoke of the plunger.*

25. A method as defined in claim 22 wherein said flat carton blank is formed of a laminate comprising paper board and a film of plastic material, said film of plastic material providing the adhesive for adhering said gusset wall panels to said end portions.

26. A method as defined in claim 25 wherein said film of plastic material is locally heated by applying hot air thereto to provide the adhesive for adhering said gusset wall panels to said end portions.

*27. A method as defined in claim 24 wherein the progressive application of adhesive adhering pressure is accomplished by moving the integral corner construction past a pair of cooperating pressure rolls during the operative stroke of the plunger.*

*28. A method as defined in claim 21 wherein the progressive application of adhesive adhering pressure is accomplished by moving the integral corner constructions past pairs of cooperating pressure rolls during the operative stroke of the plunger.*

*29. A carton tray as defined in claim 1 wherein the free peripheral edge of each of said gusset wall panels includes a pair of straight edge portions disposed perpendicular to one another.*

* * * * *